(12) United States Patent
Hiratsuka

(10) Patent No.: US 11,834,098 B2
(45) Date of Patent: Dec. 5, 2023

(54) VEHICLE FRAME STRUCTURE

(71) Applicant: Honda Motor Co., Ltd., Tokyo (JP)

(72) Inventor: Kuruto Hiratsuka, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 18/074,518

(22) Filed: Dec. 5, 2022

(65) Prior Publication Data
US 2023/0219622 A1 Jul. 13, 2023

(30) Foreign Application Priority Data
Jan. 7, 2022 (CN) .......................... 202210017426.2

(51) Int. Cl.
*B62D 21/00* (2006.01)
*B22D 17/00* (2006.01)

(52) U.S. Cl.
CPC .............. *B62D 21/00* (2013.01); *B22D 17/00* (2013.01)

(58) Field of Classification Search
CPC .............. B62D 21/00; B21D 21/00–05; B21D 21/07–10; B22D 17/00
See application file for complete search history.

(56) References Cited

U.S. PATENT DOCUMENTS 9,216,775 B2 * 12/2015 Ohhama .............. B62D 29/008

FOREIGN PATENT DOCUMENTS

JP 5879438 3/2016

* cited by examiner

*Primary Examiner* — Adam Krupicka
(74) *Attorney, Agent, or Firm* — JCIPRNET

(57) ABSTRACT

A vehicle frame structure capable of achieving light weight, improving structural rigidity, and providing a good casting and forming effect is provided. The vehicle frame structure includes a pair of side portions and a connecting portion. The pair of side portions extends in a vehicle front-rear direction and is mounted on a vehicle body. The connecting portion is arranged as an elongated structure having a pair of long sides and is connected between the pair of side portions. The pair of side portions and the connecting portion are integrally formed by casting through injecting of molten metal from one side of the pair of long sides of the connecting portion. The connecting portion has a film surface connecting the pair of side portions and has a plurality of elongated holes extending radially from the center of the film surface towards the other side of the pair of long sides.

6 Claims, 3 Drawing Sheets

VEHICLE FRAME STRUCTURE

CROSS-REFERENCE TO RELATED APPLICATION

This application claims the priority benefit of China application no. CN,202210017426.2, filed on Jan. 7, 2022. The entirety of the above-mentioned patent application is hereby incorporated by reference herein and made a part of this specification.

BACKGROUND

Technical Field

The disclosure relates to a vehicle frame structure.

Description of Related Art

In the related art (Japanese Patent No. 5879438), in order to improve the energy efficiency of a vehicle as a moving body, it is expected that the weight of the vehicle body structure of the vehicle can be lowered. Regarding the vehicle body structure of a vehicle, in addition to the main part of the vehicle body, some vehicle frame structures, such as sub frames used to support vehicle devices such as the suspension system, are also provided most of the time. Typically, a sub frame is made of metal through a casting and forming process, and a plurality of light-weight holes are arranged in the sub frame in order to reduce the weight of the vehicle body structure in the casting and forming process.

However, in the casting and forming process, when the molten metal is injected from a position corresponding to the front of the sub frame in the mold, the molten metal spreads radially towards a position corresponding to the rear of the sub frame in the mold. At this time, the structures corresponding to the light-weight holes on the mold will hinder the flow of the molten metal, resulting in a poor casting and forming effect. Besides, when light-weight holes are arranged, other reinforcing structures that can improve the structural rigidity need to be considered, but these reinforcing structures may also have an effect on the flow path of the molten metal.

SUMMARY

The disclosure provides a vehicle frame structure include a pair of side portions and a connecting portion. The pair of side portions extends in a vehicle front-rear direction and is mounted on a vehicle body. The connecting portion is arranged as an elongated structure having a pair of long sides and is connected between the pair of side portions. The pair of side portions and the connecting portion are integrally formed by casting through injecting of molten metal from one side of the pair of long sides of the connecting portion. The connecting portion has a film surface connecting the pair of side portions. The connecting portion has a plurality of elongated holes extending radially from the center of the film surface towards the other side of the pair of long sides.

In order to make the aforementioned and other features and advantages of the invention more comprehensible, several embodiments accompanied with figures are described in detail below.

DESCRIPTION OF THE EMBODIMENTS

The disclosure provides a vehicle frame structure capable of achieving light weight, improving structural rigidity, and providing a good casting and forming effect.

The disclosure provides a vehicle frame structure include a pair of side portions and a connecting portion. The pair of side portions extends in a vehicle front-rear direction and is mounted on a vehicle body. The connecting portion is arranged as an elongated structure having a pair of long sides and is connected between the pair of side portions. The pair of side portions and the connecting portion are integrally formed by casting through injecting of molten metal from one side of the pair of long sides of the connecting portion. The connecting portion has a film surface connecting the pair of side portions. The connecting portion has a plurality of elongated holes extending radially from the center of the film surface towards the other side of the pair of long sides.

In an embodiment of the disclosure, at least part of the elongated holes each has a shape in which an opening width becomes smaller towards the other side of the pair of long sides.

In an embodiment of the disclosure, the connecting portion has a plurality of protruding ribs extending radially from the center of the film surface towards the other side of the pair of long sides.

In an embodiment of the disclosure, the protruding ribs and the elongated holes are arranged in an alternating manner, so that the protruding ribs are located between each adjacent two of the elongated holes.

To sum up, in the vehicle frame structure provided by the disclosure, the pair of side portions and the connecting portion are integrally formed by casting through injecting of molten metal from one side of the pair of long sides of the connecting portion. The connecting portion has the film surface connecting the pair of side portions, and the connecting portion has the plurality of elongated holes extending radially from the center of the film surface towards the other side of the pair of long sides. In this way, the elongated holes extending radially can be used as light-weight holes in the vehicle frame structure, and the film surface on the connecting portion may be used to increase the structural rigidity. Further, in the casting and forming process, the elongated holes extending radially may match the molten metal that spreads radially without hindering the flow of the molten metal. Accordingly, the vehicle frame structure provided by the disclosure is able to achieve light weight, improve structural rigidity, and provide a good casting and forming effect.

Figure 1:
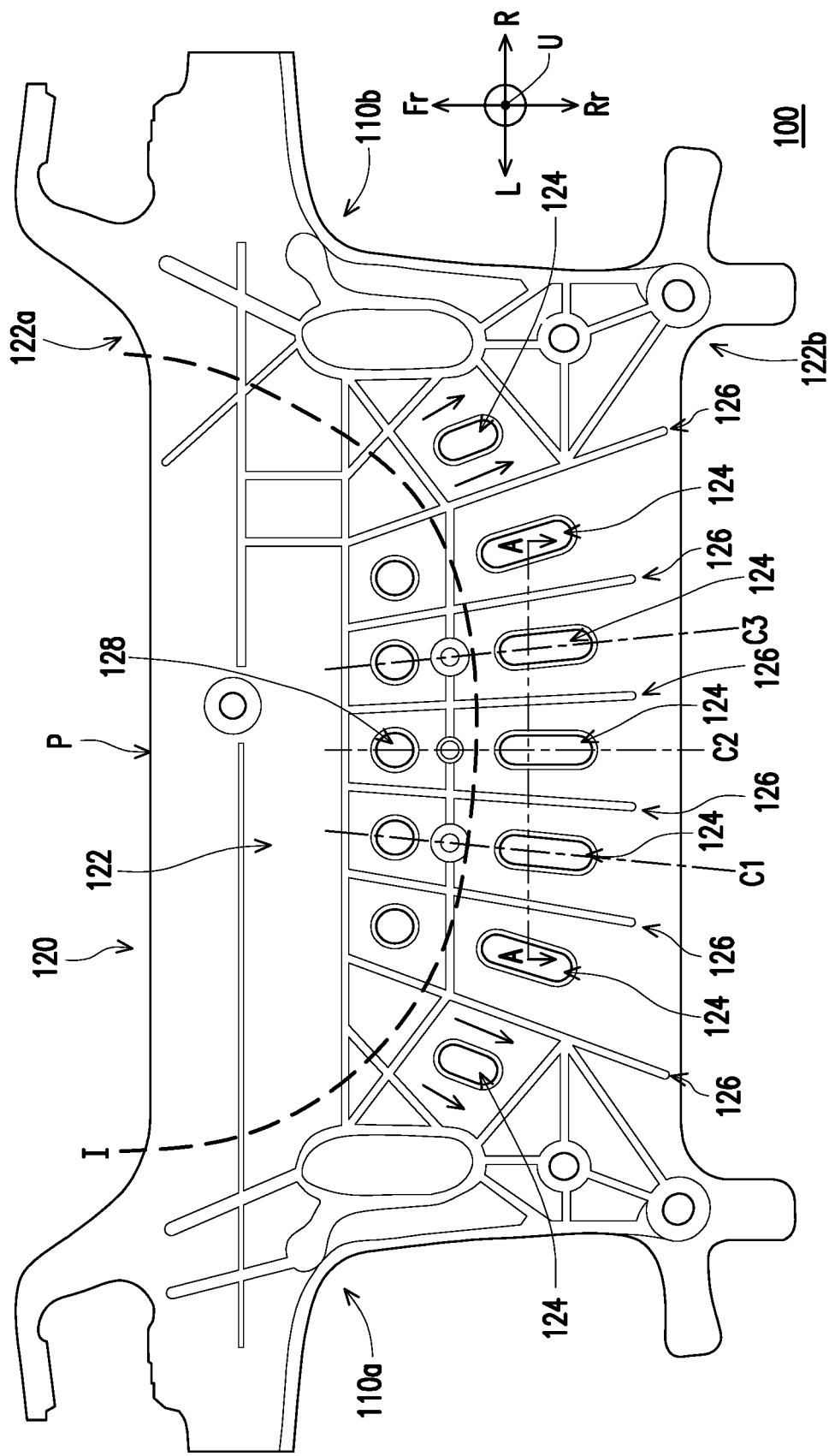
FIG. 1 is a schematic top view of a vehicle frame structure according to an embodiment of the disclosure.
Figure 2:
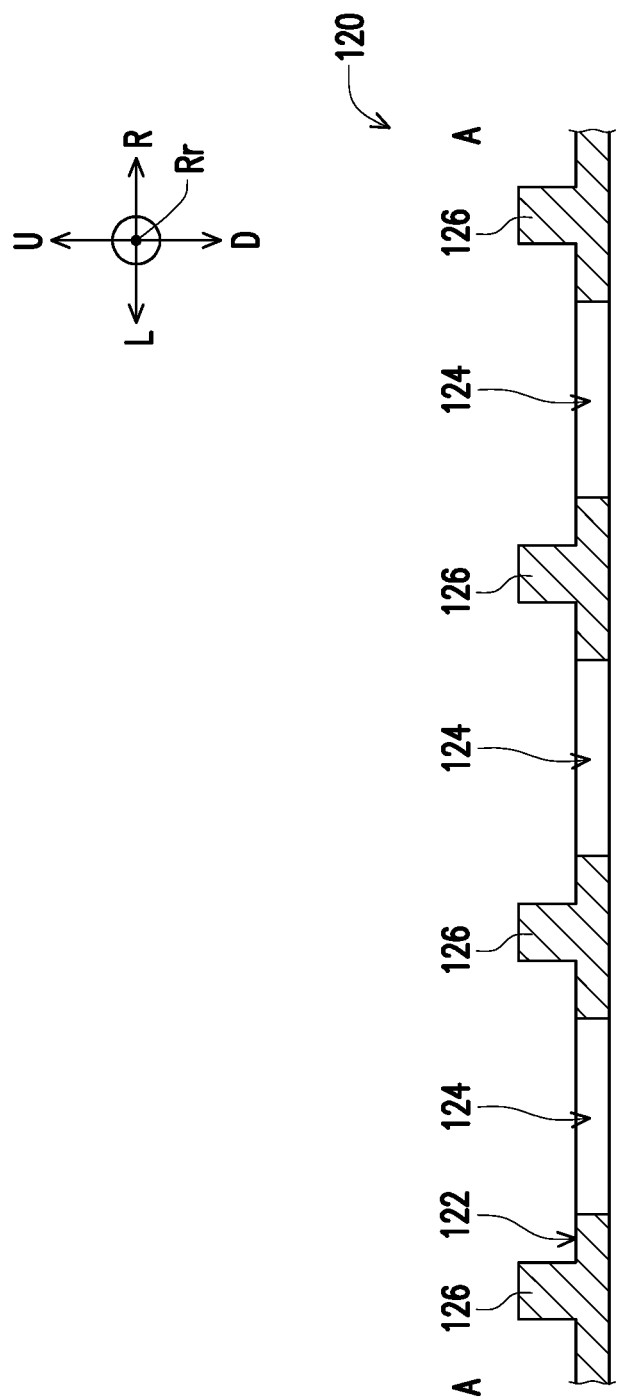
FIG. 2 is a schematic cross-sectional view of the vehicle frame structure shown in FIG. 1 taken along the tangent line A-A.
Figure 3:
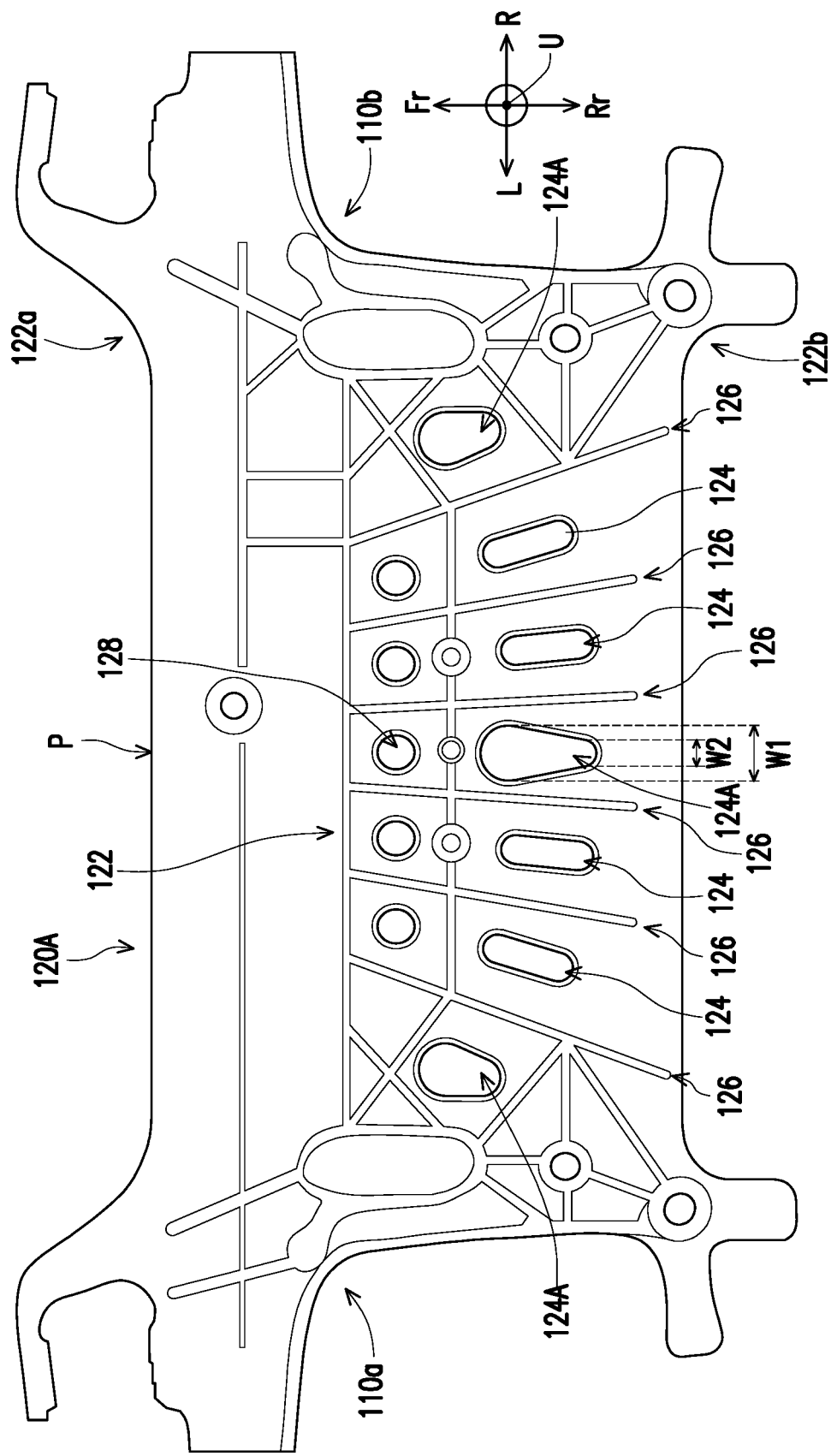
FIG. 3 is a schematic top view of the vehicle frame structure shown in FIG. 1 in another variation example.

Descriptions of the disclosure are given with reference to the exemplary embodiments illustrated by the accompanying drawings. Herein, FIG. 1 is a schematic top view of a vehicle frame structure according to an embodiment of the disclosure. FIG. 2 is a schematic cross-sectional view of the vehicle frame structure shown in FIG. 1 taken along the tangent line A-A. FIG. 3 is a schematic top view of the vehicle frame structure shown in FIG. 1 in another variation example. The specific structure of a vehicle frame structure 100 of the present embodiment will be described below with reference to FIG. 1 and FIG. 2, and another variation example of the vehicle frame structure 100 will be described with reference to FIG. 3. However, the vehicle frame structure 100 is only one example of the disclosure, and the disclosure is not limited thereto.

With reference to FIG. 1, in this embodiment, the vehicle frame structure 100 is adapted to be mounted on the front or rear of a vehicle as a part of a vehicle body (not shown). The vehicle frame structure 100 includes a pair of side portions 110a and 110b and a connecting portion 120. The pair of side portions 110a and 110b extend in a vehicle front-rear direction (e.g., a vehicle front direction Fr and a vehicle rear direction Rr in FIG. 1) and are mounted on a vehicle body (not shown). The connecting portion 120 is arranged as an elongated structure having a pair of long sides 122a and 122b and is connected between the pair of side portions 110a and 110b. Further, the pair of side portions 110a and 110b and the connecting portion 120 are integrally formed by casting through injecting molten metal from one side of the pair of long sides 112a and 112b (e.g., the long side 122a corresponding to the vehicle front direction Fr) of the connecting portion 120. Further, the connecting portion 120 has a film surface 122 connecting the pair of side portions 110a and 110b. The connecting portion 120 has a plurality of elongated holes 124 extending radially from the center of the film surface 122 towards the other side (e.g., the long side 122b corresponding to the vehicle rear direction Rr) of the pair of long sides 122a and 122b.

To be specific, in this embodiment, the vehicle frame structure 100 is a single frame structure formed by casting through molten metal, for example, formed by injecting a metal such as aluminum as a molten metal into a corresponding mold (not shown). The single frame structure obtained by casting includes the pair of side parts 110a and 110b and the connecting portion 120, and other parts, and the connecting portion 120 has the film surface 122 and the elongated holes 124. Herein, the entire vehicle frame structure 100 has a substantially elongated structure due to the arrangement of the connecting portion 120, for example, extending in a vehicle width direction (e.g., a vehicle left direction L and a vehicle right direction R shown in FIG. 1), but the disclosure is not limited thereto. In this way, during the casting and forming process, molten metal is injected from one side of the pair of long sides 122a and 122b of the connecting portion 120, so that the molten metal flows to the other side of the pair of long sides 122a and 122b. Compared to the method of injecting from the short side (i.e., one side corresponding to the pair of side portions 110a and 110b) of the connecting portion 120, in this method provided by the disclosure, the flow path of the molten metal is short, and the vehicle frame structure 100 may thus be well formed. However, in the disclosure, it is not limited from which side of the pair of long sides 122a and 122b the molten metal is injected, and it can be adjusted according to needs.

Further, in this embodiment, when the molten metal is injected into the mold from a position corresponding to one side (e.g., the long side 122a) of the pair of long sides 122a and 122b of the connecting portion 120 in the mold, it is preferably injected from the center of one side (e.g., the long side 122a) of the pair of long sides 122a and 122b, e.g., the injection point P shown in FIG. 1. The molten metal is thus made to flow uniformly to the left and right sides and spreads radially towards the position corresponding to other side (e.g., the long side 122b) of the pair of long sides 122a and 122b of the connecting portion 120 in the mold. However, in the disclosure, it is not limited from which position of one side (e.g., the long side 122a) of the pair of long sides 122a and 122b the molten metal is injected, and it can be adjusted according to needs.

Besides, in this embodiment, as shown in FIG. 1, the film surface 122 is a surface formed of molten metal during the casting process of the connecting portion 120. Therefore, the pair of long sides 122a and 122b can be treated as the edges of the film surface 122, and the film surface 122 presents an elongated structure extending in the vehicle width direction (e.g., the vehicle left direction L and the vehicle right direction R shown in FIG. 1) and is then connected the pair of side portions 110a and 110b. That is, the formation of the film surface 122 enables the connecting portion 120 to be more firmly connected to the pair of side portions 110a and 110b. As such, even if the connecting portion 120 is provided with the elongated holes 124 as light-weight holes, the structural rigidity of the connecting portion 120 may still be improved via the film surface 122 on the connecting portion 120.

In addition, in the present embodiment, the connecting portion 120 is provided with the plurality of elongated hole 124 as light-weight holes, so that light weight may be achieved. Herein, the elongated holes 124 are arranged in a curved shape in the vehicle width direction (e.g., the vehicle left direction L and the vehicle right direction R shown in FIG. 1), for example, along an imaginary line I shown in FIG. 1. The imaginary line I is an imaginary curve protruding from one side (e.g., the long side 122a) of the pair of long sides 122a and 122b to the other side (e.g., the long side 122b) of the pair of long sides 122a and 122b in the vehicle width direction. Further, the elongated holes 124 extend radially, which means that the center lines (e.g., the center lines C1, C2, C3, etc. shown in FIG. 1) of the elongated holes 124 are relatively close at positions adjacent to the center of the film surface 122 and are relatively far apart at positions adjacent to the other side (e.g., the long side 122b) of the pair of long sides 122a and 122b. Therefore, the elongated holes 124 extend radially from one side (e.g., the long side 122a) to the other side (e.g., the long side 122b) of the pair of long sides 122a and 122b.

As such, in this embodiment, as shown in FIG. 1, when the molten metal is injected into the mold from the injection point P corresponding to one side (e.g., the long side 122a) of the pair of long sides 122a and 122b of the connecting portion 120 in the mold, from the injection point P, the molten metal spreads in the directions indicated by a plurality of arrows along the imaginary curve indicated by the imaginary line I, bypasses the structures for forming the elongated holes 124 on the mold, and flows to a portion corresponding to the other side (e.g., the long side 122b) of the pair of long sides 122a and 122b in FIG. 1. After the molten metal fills the entire mold and the casting is completed, the single frame structure formed by molten metal is removed from the mold, and the vehicle frame structure 100 including the pair of side portions 110a and 110b and the connecting portion 120 having the film surface 122 and the elongated holes 124 is obtained.

Therefore, in this embodiment, in the casting and forming process, the elongated holes 124 extend radially from the center of the film surface 122 of the connecting portion 120 towards the other side (e.g., the long side 122b) of the pair of long sides 122a and 122b. As such, the elongated holes 124 extending radially may match the molten metal that spreads radially without hindering the flow of the molten metal. That is, the structures for forming the elongated holes 124 extending radially in the mold match the flow path of the molten metal, so that the flow of the molten metal is not hindered, and a good casting and forming effect may be achieved.

Further, in this embodiment, as shown in FIG. 1 and FIG. 2, the connecting portion 120 has a plurality of protruding ribs 126 extending radially from the center of the film surface 122 towards the other side (e.g., the long side 122b) of the pair of long sides 122a and 122b. The protruding ribs 126 are provided on the surface of the connecting portion 120 corresponding to a vehicle up direction U as shown in FIG. 2. However, in other embodiments that are not shown, the protruding ribs 126 may also be arranged on the surface of the connecting portion 120 corresponding to a vehicle down direction D or may be arranged on both upper and lower side surfaces of the connecting portion 120. The number, size, arrangement position, and arrangement of the protruding ribs 126 may be selected according to needs, and the disclosure is not limited thereto.

To be specific, in this embodiment, the protruding ribs 126 extend radially, which means that the protruding ribs 126 are linear. Further, the protruding ribs 126 are relatively close at positions adjacent to the center of the film surface 122 and are relatively far apart at positions adjacent to the other side (e.g., the long side 122b) of the pair of long sides 122a and 122b. Therefore, the protruding ribs 126 extend radially from one side (e.g., the long side 122a) to the other side (e.g., the long side 122b) of the pair of long sides 122a and 122b. Preferably, the protruding ribs 126 and the elongated holes 124 are arranged in an alternating manner, so that the protruding ribs 126 are located between each adjacent two of the elongated holes 124. That is, one protruding rib 126 is provided between every two adjacent elongated holes 124.

As such, in this embodiment, as shown in FIG. 1, when the molten metal is injected into the mold from a position corresponding to one side (e.g., the long side 122a) of the pair of long sides 122a and 122b of the connecting portion 120 in the mold, the molten metal bypasses the structures for forming the elongated holes 124 on the mold and flows towards the structures for forming the protruding ribs 126 on the mold. That is, the structures on the mold to form the protruding ribs 126 have sufficient space to direct the flow of molten metal. The molten metal bypassing the structures for forming the elongated holes 124 on the mold may flow more smoothly to the portion corresponding to the other side (i.e., the long side 112b) of the pair of long sides 122a and 122b in the mold and may increase the thickness around the elongated holes 124 serving as light-weight holes.

Therefore, in this embodiment, in the casting and forming process, the protruding ribs 126 extend radially from the center of the film surface 122 of the connecting portion towards the other side (e.g., the long side 122b) of the pair of long sides 122a and 122b. As such, the protruding ribs 126 extending radially may match the molten metal that spreads radially, so as to guide the flow of the molten metal more smoothly. By arranging the protruding ribs 126 and the elongated holes 24 in an alternating manner, the molten metal may flow smoothly at each portion. That is, the structures for forming the protruding ribs 126 in the mold extend radially to match the flow path of the molten metal, so that the flow of the molten metal can be improved, and a good casting and forming effect may be achieved.

Further, in this embodiment, the protruding ribs 126 are formed together in the aforementioned casting and forming process. That is, the protruding ribs 126 are also part of the connecting portion 120. As such, the arrangement of the protruding ribs 126 may increase the local thickness of the connecting portion 120 in the vehicle vertical direction (e.g., the vehicle up direction U and the vehicle down direction D in FIG. 2). That is, the connecting portion 120 may increase the structural rigidity through the arrangement of the protruding ribs 126. As such, even if the connecting portion 120 is provided with the elongated holes 124 as light-weight holes, the structural rigidity of the connecting portion 120 may still be improved via the protruding ribs 126.

Besides, in this embodiment, as shown in FIG. 1, the connecting portion 120 is also provided with a plurality of circular holes 128 acting as cooling holes for cooling a drive source (not shown) in the vehicle on which the vehicle frame structure 100 is mounted. The elongated holes 124 are holes configured to extend along the respective center lines (e.g., center lines C1, C2, C3, etc. shown in FIG. 1) in the planar direction of the connecting portion 120 (the extending directions of the respective center lines are defined as the longitudinal direction), and the circular holes 128 refer to holes (not limited to perfect circles) that are configured to have no obvious longitudinal direction in the plane direction of the connecting portion 120.

Therefore, in this embodiment, as shown in FIG. 1, the circular holes 128 are disposed in the extending direction of the center lines of the elongated holes 124 (the center lines C1, C2, C3, etc. shown in FIG. 1). That is, the circular holes 128 are arranged radially. As such, when the molten metal is injected into the mold from a position corresponding to one side (e.g., the long side 122a) of the pair of long sides 122a and 122b of the connecting portion 120 in the mold, the molten metal bypasses the structures for forming the elongated holes 128 on the mold. The elongated holes 128 extending radially may match the molten metal that spreads radially without hindering the flow of the molten metal, and a good casting and forming effect is thus achieved. Further, the circular holes 128 acting as cooling holes also have the effect of reducing weight (i.e., may be used as light-weight holes). However, the number, size, arrangement position, and arrangement of the circular holes 128 may be selected according to needs, and the disclosure is not limited thereto.

In addition, in this embodiment, the elongated holes 124 shown in FIG. 1 and FIG. 2 are holes having substantially the same opening width at opposite ends in the longitudinal direction (i.e., the extending direction of the center line C1). However, in the variation example shown in FIG. 3, at least part of the elongated holes (e.g., an elongated hole 124A) of a connecting portion 120A each has a shape in which the opening width becomes smaller towards the other side (e.g., the long side 122b) of the pair of long sides 122a and 122b. That is, as shown in FIG. 3, the elongated hole 124A located at the center in the vehicle width direction (e.g., the vehicle left direction L and the vehicle right direction R as shown in FIG. 3) has an opening width W1 at one end corresponding to the center of the film surface 122 and an opening width W2 at a portion corresponding to the other side (e.g., the long side 122b) of the pair of long sides 122a and 122b. The opening width W1 is greater than the opening width W2.

Therefore, in this embodiment, in the casting and forming process, the opening width of the elongated hole 124A becomes smaller towards the other side (e.g., the long side 122b) of the pair of long sides 122a and 122b, and the flow path of the molten metal on the outside of the elongated hole 124A becomes larger towards the other side (e.g., the long side 122b) of the pair of long sides 122a and 122b. Therefore, the flow velocity of the molten metal flowing towards the other side (e.g., the long side 122b) of the pair of long sides 122a and 122b may be prevented from decreasing. That is, the elongated hole 124A is arranged so that the opening width becomes smaller towards the direction away from the injection point P to match the flow path of the molten metal. In such an arrangement, the flow of the molten metal may be improved, and a good casting and forming effect may be achieved.

In view of the foregoing, in the vehicle frame structure provided by the disclosure, the pair of side portions and the connecting portion are integrally formed by casting through injecting of molten metal from one side of the pair of long sides of the connecting portion. The connecting portion has the film surface connecting the pair of side portions, and the connecting portion has the plurality of elongated holes extending radially from the center of the film surface towards the other side of the pair of long sides. Preferably, the connecting portion has the plurality of protruding ribs extending radially from the center of the film surface towards the other side of the pair of long sides. The protruding ribs and the elongated holes are arranged in an alternating manner, so that the protruding ribs are located between each adjacent two of the elongated holes. In this way, the elongated holes extending radially can be used as light-weight holes in the vehicle frame structure, and the film surface on the connecting portion may be used to increase the structural rigidity. Further, in the casting and forming process, the elongated holes extending radially may match the molten metal that spreads radially without hindering the flow of the molten metal. Accordingly, the vehicle frame structure provided by the disclosure is able to achieve light weight, improve structural rigidity, and provide a good casting and forming effect.

Finally, it is worth noting that the foregoing embodiments are merely described to illustrate the technical means of the disclosure and should not be construed as limitations of the disclosure. Even though the foregoing embodiments are referenced to provide detailed description of the disclosure, people having ordinary skill in the art should understand that various modifications and variations can be made to the technical means in the disclosed embodiments, or equivalent replacements may be made for part or all of the technical features; nevertheless, it is intended that the modifications, variations, and replacements shall not make the nature of the technical means to depart from the scope of the technical means of the embodiments of the disclosure.

What is claimed is:

1. A vehicle frame structure, comprising:
a pair of side portions extending in a vehicle front-rear direction and mounted on a vehicle body; and
a connecting portion arranged as an elongated structure connected between the pair of side portions, the elongated structure having a first long side and a second long side opposite to the first long side, wherein
the pair of side portions and the connecting portion are integrally formed by casting through injecting of molten metal from the first long side of the connecting portion,
the connecting portion has a film surface connecting the pair of side portions, and
the connecting portion has a plurality of elongated holes extending radially from the center of the film surface towards the second long side,
wherein a plurality of center lines correspond to the plurality of elongated holes,
wherein each of the plurality of center lines is a center line extending in a longitudinal direction of each of the plurality of elongated holes,
wherein the plurality of center lines of the plurality of elongated holes extend radially from a center of the film surface towards the second long side,
wherein the plurality of elongated holes are relatively close to each other at the center of the film surface and are relatively far apart to each other at the second long side.

2. The vehicle frame structure according to claim 1, wherein
at least part of the elongated holes each has a shape in which an opening width becomes smaller towards the second long side relative to the first long side.

3. The vehicle frame structure according to claim 1, wherein
the connecting portion has a plurality of protruding ribs extending radially from the center of the film surface towards the second long side.

4. The vehicle frame structure according to claim 2, wherein
the connecting portion has a plurality of protruding ribs extending radially from the center of the film surface towards the second long side.

5. The vehicle frame structure according to claim 3, wherein
the protruding ribs and the elongated holes are arranged in an alternating manner, so that the protruding ribs are located between each adjacent two of the elongated holes.

6. The vehicle frame structure according to claim 4, wherein
the protruding ribs and the elongated holes are arranged in an alternating manner, so that the protruding ribs are located between each adjacent two of the elongated holes.

* * * * *